(12) United States Patent
Wang et al.

(10) Patent No.: US 10,890,830 B2
(45) Date of Patent: Jan. 12, 2021

(54) GIMBAL CONTROL METHOD, GIMBAL CONTROL APPARATUS, AND GIMBAL

(71) Applicant: SZ DJI OSMO TECHNOLOGY CO., LTD., Shenzhen (CN)

(72) Inventors: Yan Wang, Shenzhen (CN); Bingzhen Yang, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/513,157

(22) Filed: Jul. 16, 2019

(65) Prior Publication Data

US 2019/0339591 A1    Nov. 7, 2019

Related U.S. Application Data

(63) Continuation of application No. 16/169,532, filed on Oct. 24, 2018, now Pat. No. 10,394,107, which is a continuation of application No. PCT/CN2016/084156, filed on May 31, 2016.

(51) Int. Cl.
| | | |
|---|---|---|
| *G03B 17/56* | (2006.01) | |
| *G05D 3/00* | (2006.01) | |
| *F16M 13/04* | (2006.01) | |
| *G06T 7/246* | (2017.01) | |
| *F16M 11/06* | (2006.01) | |
| *G02B 7/00* | (2006.01) | |

(52) U.S. Cl.
CPC ............. *G03B 17/56* (2013.01); *F16M 13/04* (2013.01); *G05D 3/00* (2013.01); *F16M 11/06* (2013.01); *G02B 7/005* (2013.01); *G06T 7/246* (2017.01); *G06T 2207/10016* (2013.01)

(58) Field of Classification Search
CPC ..... G03B 17/56; F16M 13/04; H04N 5/23245
See application file for complete search history.

(56) References Cited

U.S. PATENT DOCUMENTS

| | | | |
|---|---|---|---|
| 9,170,429 B2 * | 10/2015 | Shibata | .............. H04N 5/23248 |
| 2005/0018073 A1 | 1/2005 | Pilu | |
| 2010/0149400 A1 | 6/2010 | Sugino | |

(Continued)

FOREIGN PATENT DOCUMENTS

| | | |
|---|---|---|
| CN | 101699858 A | 4/2010 |
| CN | 201903734 U | 7/2011 |
| CN | 102662404 A | 9/2012 |

(Continued)

OTHER PUBLICATIONS

The World Intellectual Property Organization (WIPO) International Search Report for PCT/CN2016/084156 dated Feb. 16, 2017 11 pages.

*Primary Examiner* — Minh Q Phan
(74) *Attorney, Agent, or Firm* — Anova Law Group, PLLC

(57) ABSTRACT

An apparatus for controlling a gimbal includes one or more processors individually or collectively configured to determine an operation mode of the gimbal according to a mode selection activation condition. The operation mode includes a walk operation mode or a sensitive operation mode. the one or more processors are further configured to, in response to determining that the operation mode is the walk operation mode, control the gimbal to adjust attitude at a lower responding speed than in the sensitive operation mode.

19 Claims, 6 Drawing Sheets

(56) References Cited

U.S. PATENT DOCUMENTS

2016/0316122 A1\* 10/2016 Watanabe ............ H04N 5/2328
2017/0227162 A1\* 8/2017 Saika .................... G03B 17/561

FOREIGN PATENT DOCUMENTS

| CN | 102999049 A | 3/2013 |
|----|-------------|--------|
| CN | 103246290 A | 8/2013 |
| CN | 104811641 A | 7/2015 |
| CN | 105116926 A | 12/2015 |
| CN | 105223967 A | 1/2016 |
| CN | 105611155 A | 5/2016 |
| WO | 2016000193 A1 | 1/2016 |

\* cited by examiner

GIMBAL CONTROL METHOD, GIMBAL CONTROL APPARATUS, AND GIMBAL

CROSS-REFERENCE TO RELATED APPLICATION

This application is a continuation of application Ser. No. 16/169,532, filed on Oct. 24, 2018, which is a continuation application of International Application No. PCT/CN2016/084156, filed on May 31, 2016, the entire contents of both of which are incorporated herein by reference.

TECHNICAL FIELD

The present disclosure relates to the field of gimbal and, more particularly, to a gimbal control method, a gimbal control apparatus, and a gimbal.

BACKGROUND

A hand-held gimbal has small size, is easy to carry, and can carry a small photographing assembly, such as a photographing apparatus, a camera, a smart phone, etc. Conventional handheld gimbals need a user to set control parameters to control gimbal rotations, such that the photographing assembly may be controlled to stay at a determined attitude for photographing during moving.

However, due to the excessive number of control parameters that need to be adjusted and influences among various control parameters, the user often cannot adjust and obtain appropriate control parameters and thus cannot ensure a stability of the photographing assembly.

SUMMARY

In accordance with the disclosure, there is provided a gimbal including an adjustment mechanism and a processor in communication with the adjustment mechanism. The processor is configured to obtain a mode selection activation condition and determine an operation mode according to the mode selection activation condition. The mode selection activation condition includes at least one of a control instruction or an attitude change parameter of the adjustment mechanism. The operation mode includes a walk operation mode or a sensitive operation mode. The adjustment mechanism is configured to change attitude in the walk operation mode at a lower responding speed than in the sensitive operation mode.

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure. Further, in the present disclosure, the disclosed embodiments and the features of the disclosed embodiments may be combined under conditions without conflicts.

Exemplary embodiments will be described with reference to the accompanying drawings, in which the same numbers refer to the same or similar elements unless otherwise specified.

As used herein, when a first component is referred to as "fixed to" a second component, it is intended that the first component may be directly attached to the second component or may be indirectly attached to the second component via another component. When a first component is referred to as "connecting" to a second component, it is intended that the first component may be directly connected to the second component or may be indirectly connected to the second component via a third component between them. The terms "perpendicular," "horizontal," "left," "right," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe exemplary embodiments, instead of limiting the present disclosure. The term "and/or" used herein includes any suitable combination of one or more related items listed.

The methods and processes described herein may be implemented by hardware circuits or apparatuses. The hardware circuits or apparatuses may include, but are not limited to, application specific integrated circuit (ASIC) chips, field programmable gate arrays (FPGAs), dedicated or shared processors that execute certain software modules or sections of code at certain times, and/or other programmable logic devices that are currently available or are to be developed in the future. When the hardware circuits or apparatuses are activated, the hardware circuits or apparatuses may perform the methods and processes consistent with the disclosure.

The descriptions of some embodiments are made by taking a processor as an executing entity, merely for illustrative purposes. The executing entity for gimbal control method in the present disclosure is not limited to the processor, and may be chosen according to various application scenarios.

Figure 1:
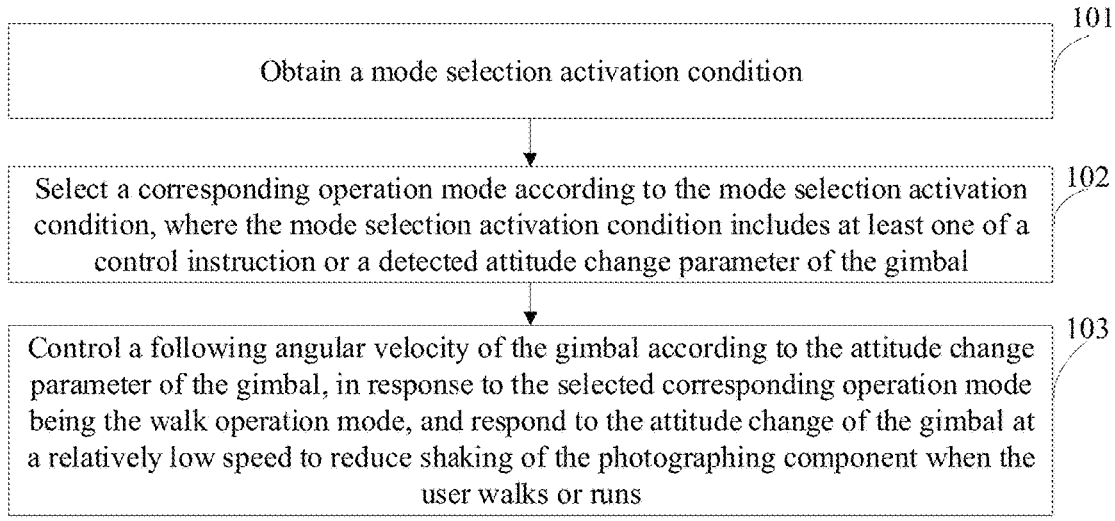
FIG. 1 is a flowchart of an exemplary gimbal control method consistent with various disclosed embodiments of the present disclosure.

FIG. 1 is a flowchart of an exemplary gimbal control method consistent with various disclosed embodiments of the present disclosure. With reference to FIG. 1, the gimbal control method is described below.

At 101, a mode selection activation condition is obtained.

At 102, a corresponding operation mode is selected according to the mode selection activation condition. The mode selection activation condition may include at least one of a control instruction or a detected attitude change parameter of the gimbal.

Various implementation approaches may be used to perform processes 101 and 102, such as two examples of implementation approaches described below.

In one implementation approach, the processor can obtain a control instruction, and select a corresponding operation mode in one or more operation modes according to the control instruction. The corresponding operation mode refers to an operation mode identified according to information carried in the control instruction and corresponding to the information.

The control instruction obtained by the processor may be sent by an operator. For example, the processor may receive a control instruction sent by the touch screen. That is, the operator may send the control instruction to the processor through the touch screen. As another example, the processor may receive a control instruction sent by a remote controller. That is, the operator can send a control instruction to the processor through the remote controller.

In another implementation approach, the processor may obtain a detected attitude change parameter of the gimbal, and select a corresponding operation mode according to the detected attitude change parameter of the gimbal. That is, the processor can automatically select the corresponding operation mode according to the attitude change parameter of the gimbal.

In some embodiments, if a detected attitude change angle of the gimbal in at least one direction is smaller than a first preset angle, a walk operation mode may be activated. In some embodiments, if a detected attitude change frequency in at least one direction of the gimbal is a preset frequency and the attitude change angle is smaller than the first preset angle, the walk operation mode is activated.

If the detected attitude change angle in at least one direction is larger than or equal to a second preset angle, a sensitive operation mode may be activated.

At 103, in response to the selected corresponding operation mode being the walk operation mode, a following angular velocity of the gimbal is controlled according to the attitude change parameter of the gimbal, and the attitude change of the gimbal is responded to at a relatively low speed to reduce shaking of the photographing assembly when the user walks or runs.

In some embodiments, the hand-held gimbal may include a base and a gimbal body. The gimbal body is referred to as a "gimbal" in the following descriptions. The gimbal may be rotatably connected to the base. Thus, the gimbal can be rotated relative to the base. During an operation, the base can be held by the operator. Thus, the base may have attitude changes as attitudes of the operator change. Further, the gimbal may perform attitude compensation in real time according to attitude changes of the base. Thus, a following angle of the gimbal may be determined by obtaining feedback information of the attitude change of the gimbal. In addition, the photographing assembly may be attached to the gimbal. The gimbal may be configured to adjust the following angle of the gimbal to ensure that the photographing apparatus can be held at a determined attitude for photographing during moving.

The operation mode may include one of a plurality of operation modes, which can include, but not limited to, for example, at least one of a walk operation mode or a sensitive operation mode.

In some embodiments, when the operator walks or runs, the gimbal may repeatedly perform small-angle attitude changes. In some embodiments, for example, the attitude change angle may be within approximately 10 degrees. In these embodiments, if the gimbal stays at a high speed following status, i.e., a following angular velocity being relatively high, the photographing assembly carried by the gimbal may be caused to shake repeatedly, and stability of images captured by the photographing assembly may not be ensured. Thus, as the gimbal repeatedly performs small-angle attitude changes, the following angular velocity of the gimbal may be slowly adjusted to suppress small-angle shaking of the photographing assembly. Thus, a walk operation mode may be adopted correspondingly. The walk operation mode may be configured to control the following angular velocity of the gimbal according to the attitude change parameter of the gimbal to respond to the attitude change of the gimbal at a relatively low speed, such that the shaking of the photographing assembly when the operator, i.e., the user, walks or runs may be reduced.

In some application scenarios, for example, the user may be in a car, and the road may be bumpy for photographing during moving; or, an object that is photographed by the photographing assembly may be at a moving status. Correspondingly, when attitude changes need to be performed, the gimbal can promptly and quickly follow the attitude changes of the gimbal, such that the photographing assembly can photograph a target object for photographing. In this case, the sensitive operation mode can be adopted. The sensitive operation mode can control the following angular velocity of the gimbal according to the attitude change parameter of the gimbal to quickly adjust the attitude of the gimbal.

In some embodiments, in addition to the above-described two operation modes, an automatic matching mode may also be included. The automatic matching mode may be configured to automatically match the operation mode according to the attitude change parameter of the gimbal. That is, the automatic matching mode may be configured to automatically change or select the operation mode according to the attitude change parameter of the gimbal. The automatic matching mode may determine which operation mode is currently suitable for the gimbal according to the attitude change parameter of the gimbal, e.g., an attitude change angle and/or an attitude change frequency of the gimbal. That is, the automatic matching mode may automatically match a corresponding operation mode according to the attitude change parameter of the gimbal.

The control instruction may include, but is not limited to, at least one of a digital voltage signal, a digital current signal, or a digital power signal. Further, the control instruction may include, but is not limited to, at least one of an analog voltage signal, an analog current signal, or an analog power signal. The processor can further convert an analog signal to a digital signal.

For example, if the control instruction includes an analog pulse current signal, the processor can identify a corresponding operation mode by identifying period information of the pulse current signal. As another example, the processor can identify a corresponding operation mode by identifying amplitude information of the pulse current signal, e.g., by identifying whether the pulse current signal corresponds to a high electric level or a low electric level. Various implementation approaches may be adopted to select an operation mode according to a control instruction, and may be chosen according to various application scenarios, descriptions of which are omitted here.

In the gimbal control method of the present disclosure, a mode selection activation condition may be obtained, and a corresponding operation mode may be selected according to the mode selection activation condition. If a selected operation mode includes a walk operation mode, a following angular velocity of the gimbal may be controlled according to the attitude change parameter of the gimbal, and the attitude change of the gimbal may be responded to at a relatively low speed to reduce shaking of the photographing assembly when the user walks or runs. The user can choose a corresponding mode according to a scenario that the user stays in, and can ensure stability of the photographing assembly without a need to adjust excessive control parameters.

Figure 2A:
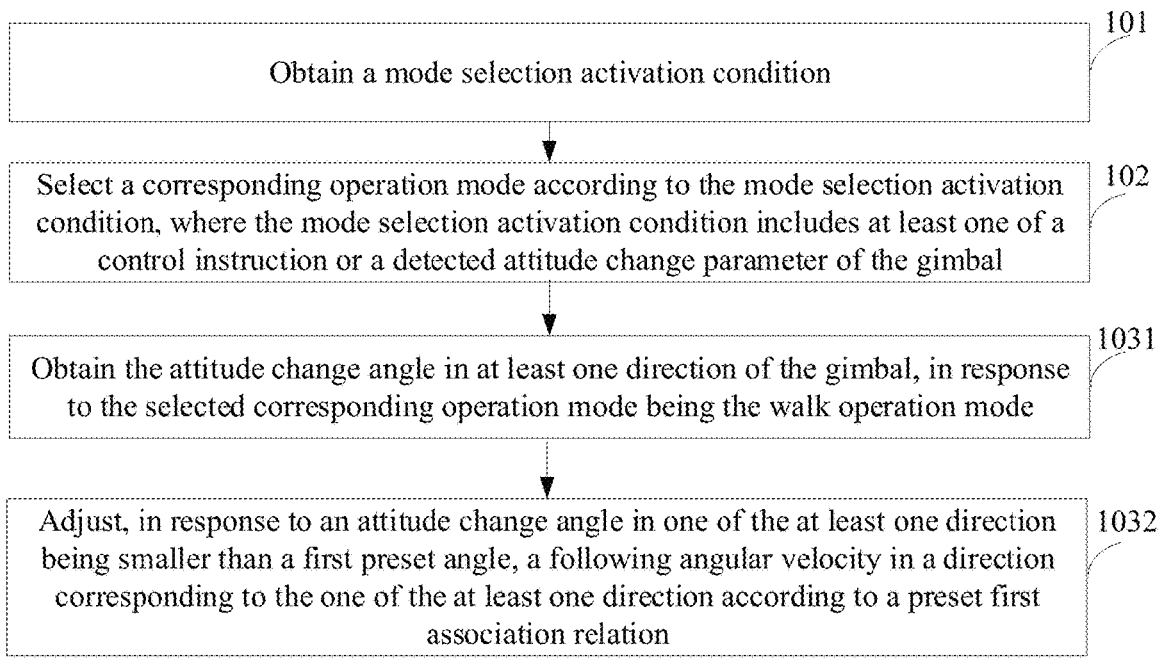
FIG. 2A is a flowchart of another exemplary gimbal control method consistent with various disclosed embodiments of the present disclosure.

In addition to the above-described examples, further descriptions are made for controlling the following angular velocity of the gimbal according to the attitude change parameter of the gimbal at process 103. FIG. 2A is a flowchart of another exemplary gimbal control method consistent with various disclosed embodiments of the present disclosure. In addition to processes 101 and 102, the control method shown in FIG. 2A further includes processes described below.

At 1031, in response to the selected corresponding operation mode being the walk operation mode, the attitude change angle in at least one direction of the gimbal is obtained.

At 1032, in response to an attitude change angle in one of the at least one direction being smaller than a first preset angle, a following angular velocity in a direction corresponding to the one of the at least one direction is adjusted according to a preset first association relation.

In some embodiments, the attitude change angle in the at least one direction may include an attitude change angle in at least one of: a yaw direction, a pitch direction, or a roll direction.

The direction corresponding to the at least one direction refers to a direction same as or opposite to the at least one direction in which the attitude change angle is smaller than the preset angle.

As running or walking generally may cause the gimbal to have an attitude change angle between approximately 6 degrees and approximately 8 degrees. In response to an attitude change angle in at least one of a yaw direction, a pitch direction, or a roll direction of the gimbal being smaller than a first preset angle, a following angular velocity of the gimbal may be adjusted according to the first association relation. In some embodiments, the first preset angle may be, for example, approximately 10 degrees.

Generally, when the user runs or walks, attitude change angles between approximately 6 degrees and approximately 8 degrees may be generated in the pitch direction and the yaw direction. In some embodiments, in response to the selected corresponding operation mode being the walk operation mode, attitude change angles of the pitch direction and the yaw direction may be obtained.

For example, if attitude change angles in three directions of the gimbal, i.e., a yaw direction, a pitch direction, and a roll direction, are obtained, and attitude change angles in the pitch direction and yaw direction both are smaller than the first preset angle, following angular velocities of the gimbal in the pitch direction and the yaw direction may be adjusted according to the first association relation. Adjusting the following angular velocities in the pitch direction and the yaw direction may be performed at a same time or one after another, which is not restricted in the present disclosure.

In some embodiments, the attitude change angle of the gimbal may be small. For example, the attitude change angle in at least one direction of the gimbal may be smaller than the first preset angle. Correspondingly, to ensure that the gimbal responds to the attitude change of the gimbal at a relatively low speed, in some embodiments, the first association relation may include an association relation indicating that the following angular velocity is a high order concave function of the attitude change angle.

The first association relation may be expressed, for example, in the following equation: $\omega = \text{sgn}(\theta) g f_1(|\theta|) = a|\theta|^4 + b|\theta|^3 + c|\theta|^2 + d|\theta| + e$, where $\theta$ is an attitude change angle of the gimbal, $\omega$ is a following angular velocity of the gimbal, $f_1$ denotes the first association relation between the following angular velocity and the attitude change angle. $f(\theta)$ being a concave function in interval $[\theta_1, \theta_2]$ means that $f(\theta)$ is continuous in interval $[\theta_1, \theta_2]$, and has a second derivative in interval $[\theta_1, \theta_2]$ that is larger than zero.

Figure 2B:
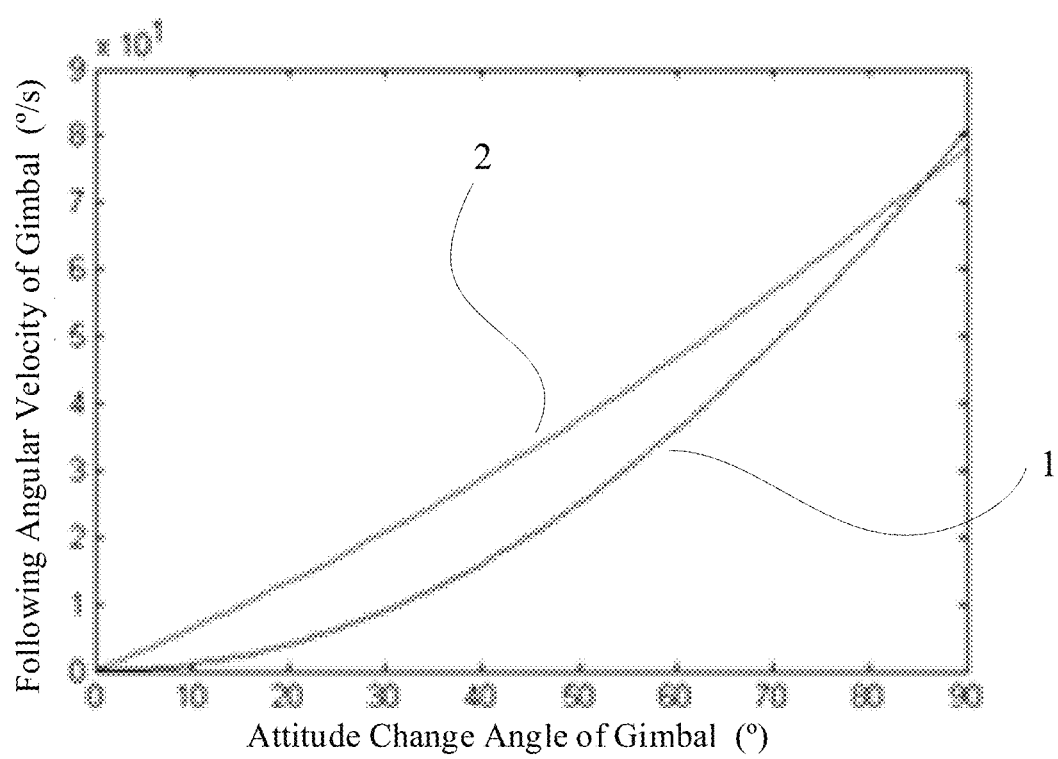
FIG. 2B is a schematic diagram of an exemplary relation between a following angular velocity and an attitude change angle consistent with various disclosed embodiments of the present disclosure.

FIG. 2B is a schematic diagram of an exemplary relation between a following angular velocity and an attitude change angle consistent with various disclosed embodiments of the present disclosure. As shown in FIG. 2B, curve 1 represents an example of the first association relation between the following angular velocity and the attitude change angle of the gimbal, and the first association relation is a concave function. The concave function can ensure that the following angular velocity of the gimbal is relatively small, in response to the attitude change angle of the gimbal being relatively small, and the following angular velocity of the gimbal is gradually increased, in response to the attitude change angle of the gimbal being gradually increased.

In some embodiments, an order of the high order concave function may be fourth order. For example, $\omega = \text{sgn}(\theta) g f_1(|\theta|) = a|\theta|^4 + b|\theta|^3 + c|\theta|^2 + d|\theta| + e$, where a, b, c, d, and e are coefficients of the fourth order concave function, and at least one of the coefficients of the fourth order concave function is larger than zero. In addition, by the definition of the fourth order function, coefficient a is not equal to zero.

Other association relation(s) between the following angular velocity of the gimbal and the attitude change angle of the gimbal may be used, as long as they can ensure that the gimbal may respond to the attitude change angle of the gimbal at a relatively low speed, in response to the attitude change angle being smaller than the first preset angle.

In addition, in the walk mode, in response to a large attitude change angle existing in at least one direction, freedom of attitude change in the at least one direction may be reduced. For example, in response to an attitude change angle in at least one direction being larger than or equal to a second preset angle, a following angular velocity in the at least one direction of the gimbal may be controlled to be equal to a preset maximum following angular velocity, where the second preset angle may be larger than or equal to the first preset angle.

In the gimbal control method of the disclosure, if the selected operation mode is a walk operation mode, an attitude change angle in at least one direction of the gimbal may be obtained. If an attitude change angle in one of the at least one direction is smaller than the first preset angle, a following angular velocity of the gimbal may be controlled to respond to the attitude change angle of the gimbal in a form of high order concave function, thereby reducing shaking of the photographing assembly when the user walks or runs.

In addition to the above-described examples, further descriptions are made for the gimbal control method.

When the user runs or walks, the gimbal may be caused to generate a regular or periodic attitude change. Thus, in some embodiments, the gimbal control method may further include obtaining an attitude change frequency in at least one direction of the gimbal. A corresponding control may be performed on the gimbal, in response to the attitude change frequency and the attitude change angle satisfying preset conditions.

Figure 3:
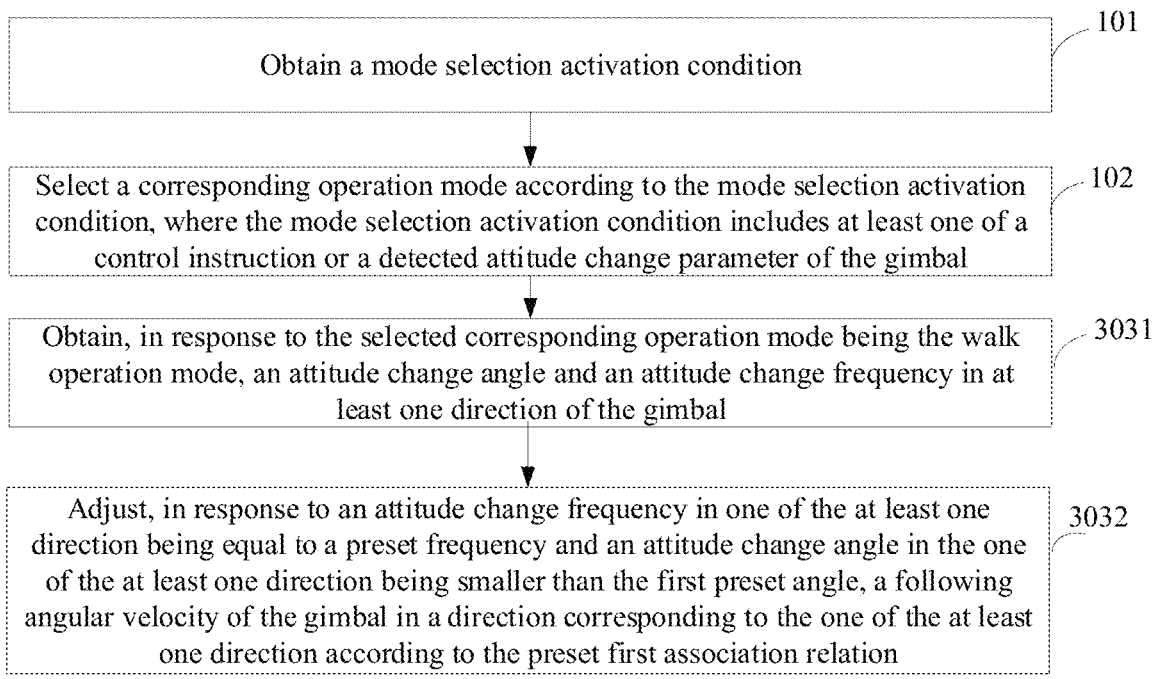
FIG. 3 is a flowchart of another exemplary gimbal control method consistent with various disclosed embodiments of the present disclosure.

FIG. 3 is a flowchart of another exemplary gimbal control method consistent with various disclosed embodiments of the present disclosure. In addition to processes 101 and 102 described above, the control method shown in FIG. 3 further includes processes described below.

At 3031, in response to the selected corresponding operation mode being the walk operation mode, an attitude change angle and an attitude change frequency in at least one direction of the gimbal are obtained.

At 3032, in response to an attitude change frequency in one of the at least one direction being equal to a preset frequency and an attitude change angle in the one of the at least one direction being smaller than the first preset angle, a following angular velocity of the gimbal in a direction corresponding to the one of the at least one direction is adjusted according to the preset first association relation.

For the first association relation, reference can be made to the above descriptions, descriptions of which are omitted here.

The user usually may generate an attitude change angle of approximately 6 degrees to approximately 8 degrees at a frequency of approximately 1 Hz during walking, and generate an attitude change angle of approximately 6 degrees to approximately 8 degrees at a frequency of approximately 2 Hz. Thus, in some embodiments, the preset frequency may be equal to approximately 1 Hz or approximately 2 Hz.

In some embodiments, in the pitch direction and the yaw direction, the attitude change frequency may be at a frequency equal to approximately 1 Hz or approximately 2 Hz, and the attitude change angle may be between approximately 6 degrees to approximately 8 degrees. Correspondingly, following angular velocities of the gimbal in in the pitch direction and the yaw direction may be adjusted separately according to the first association relation.

The attitude change angle and the attitude change frequency can be obtained through an inertial measurement unit (IMU). The IMU may include, for example, an angular velocity sensor and an acceleration sensor.

In some embodiments, the angular velocity sensor may include at least one of a gyro sensor, a potentiometer sensor, a Hall sensor, a capacitive sensor, or an optical grating sensor.

The acceleration sensor may include at least one of a piezoelectric sensor, a capacitive sensor, a servo sensor, or a piezoresistive sensor.

The gimbal may include a pitch axis arm, a yaw axis arm, and a roll axis arm that are perpendicular to each other. In some embodiments, for example, the IMU can be attached to the pitch axis arm of the gimbal.

In addition, in response to the attitude change frequency in at least one direction being equal to the preset frequency and the attitude change angle being larger than or equal to a second preset angle, a following angular velocity of the gimbal in the at least one direction may be controlled to be equal to the preset maximum following angular velocity.

In the gimbal control method of the present disclosure, if the selected operation mode is a walk operation mode, an attitude change angle and an attitude change frequency in at least one direction of the gimbal may be obtained. In response to an attitude change frequency in at least one direction being a preset frequency and an attitude change angle being smaller than a first preset angle, a following angular velocity of the gimbal in the at least one direction may be adjusted according to the preset first association relation. For example, the following angular velocity of the gimbal may be controlled to respond to the attitude change angle of the gimbal in a form of high order concave function, thereby reducing shaking of the photographing assembly when the user walks or runs.

In addition to the above-described examples, the operation mode may further include a sensitive operation mode. The sensitive operation mode is described in detail below.

Figure 4:
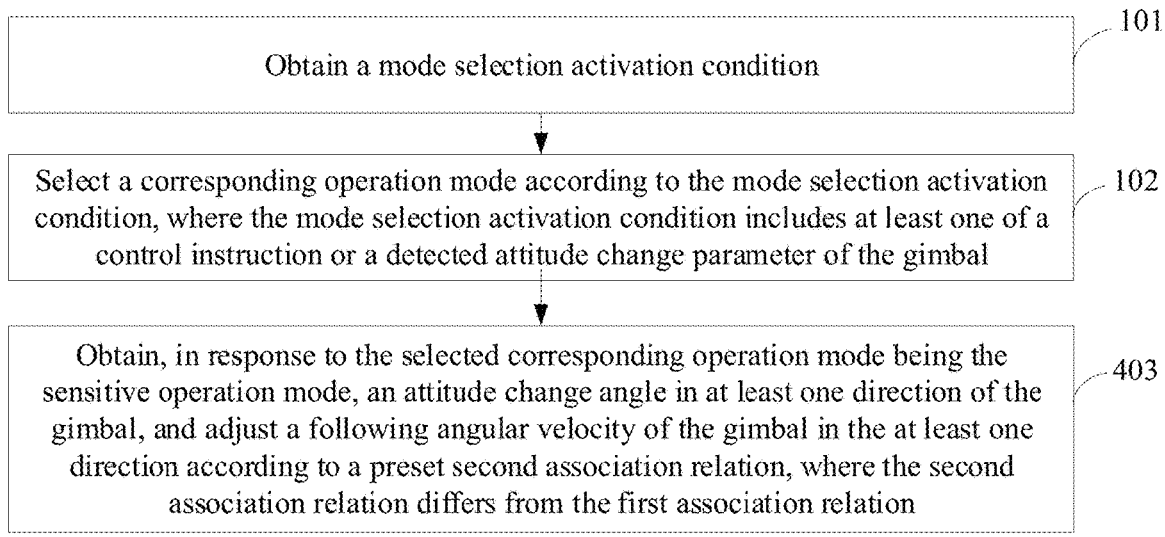
FIG. 4 is a flowchart of another exemplary gimbal control method consistent with various disclosed embodiments of the present disclosure.

FIG. 4 is a flowchart of another exemplary gimbal control method consistent with various disclosed embodiments of the present disclosure. In addition to processes 101 and 102 described above, the control method shown in FIG. 4 further includes the process described below.

At 403, in response to the selected corresponding operation mode being the sensitive operation mode, an attitude change angle in at least one direction of the gimbal is obtained, and a following angular velocity of the gimbal in the at least one direction is adjusted according to a preset second association relation, where the second association relation differs from the first association relation.

Under the sensitive operation mode, the following angular velocity of the gimbal may be adjusted according to a preset second association relation, where the second association relation may differ from the first association relation. In some embodiments, the second association relation may include a quadratic curve relation between the attitude change angle and the following angular velocity. Further, the following angular velocity may be increased in response to an increase of the attitude change angle. In some other embodiments, a cubic curve relation may exist between the attitude change angle and the following angular velocity. Further, the following angular velocity may be increased in response to an increase of the attitude change angle, to ensure that the gimbal can promptly and quickly follow the attitude change of the gimbal. As shown in FIG. 2B, curve 2 represents an example of the second association relation between the following angular velocity of the gimbal and the attitude change angle of the gimbal.

In order to promptly and quickly follow the attitude change of the gimbal in response to gimbal performing attitude change(s), in some embodiments, the attitude change angle may be in direct proportion linear relation with the following angular velocity. The second association relation may include a linear function, and the following angular velocity and the attitude change angle of the gimbal may have a direct proportion relation. The direct proportion linear relation may ensure a following performance of the gimbal, i.e., a performance of gimbal to follow the attitude change angle. In some application scenarios, even if the attitude change angle of the gimbal is relatively small, the following angular velocity of the gimbal may be relatively large.

For example, a linear example of the second association relation can be expressed as: $\omega = f_2(\theta) = k\theta + h$, where $\theta$ is an attitude change angle of the gimbal, $\omega$ is a following angular velocity of the gimbal, $f_2$ indicates the second association relation between the following angular velocity and the attitude change angle, k is a slope coefficient of the second association relation and is larger than zero, and h is an intercept coefficient of the second association relation.

In some embodiments, in the walk operation mode or the sensitive operation mode, when the attitude change angle of the gimbal is the same in a preset range, the following angular velocity of the gimbal in the walk operation mode is smaller than the following angular velocity of the gimbal in the sensitive operation mode during responding. That is, $f_2(\theta) \geq f_1(\theta)$, for $\theta$ in an open interval or a closed interval.

In the gimbal control method of the present disclosure, if the selected operation mode is a sensitive operation mode, an attitude change angle in at least one direction of the gimbal may be obtained, and a following angular velocity of the gimbal may be adjusted according to the attitude change angle and a preset direct proportion linear association relation, thereby ensuring following performance of the gimbal.

In addition to the above-described examples, the operation mode may further include an automatic matching mode. The automatic matching mode is described in detail below.

Figure 5:
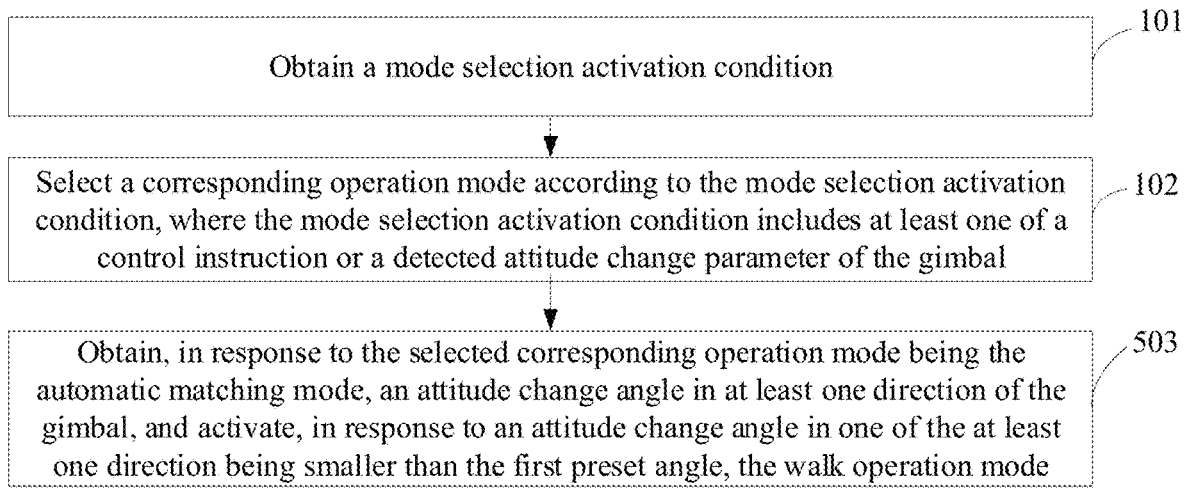
FIG. 5 is a flowchart of another exemplary gimbal control method consistent with various disclosed embodiments of the present disclosure.

FIG. 5 is a flowchart of another exemplary gimbal control method according to various disclosed embodiments of the present disclosure. In addition to processes 101 and 102 described above, the control method shown in FIG. 5 further includes process below.

At 503, in response to the selected corresponding operation mode being the automatic matching mode, an attitude change angle in at least one direction of the gimbal is obtained, and in response to an attitude change angle in one of the at least one direction of the gimbal being smaller than the first preset angle, the walk operation mode is activated.

Similar to the above-described examples, during running or walking, the gimbal may be caused to generate an attitude change angle in a range from approximately 6 degrees to approximately 8 degrees. Thus, if the automatic matching mode is selected, it may be determined which operation mode is suitable for a current following angular velocity of the gimbal according to the attitude change angle, and the corresponding operation mode may be matched.

For example, an attitude change angle in at least one direction may be relatively small. That is, an attitude change angle in at least one direction may be smaller than the first preset angle. Correspondingly, the walk operation mode may be activated in order to suppress the shaking of the photographing assembly when the user walks or runs.

In some embodiments, in addition to obtaining an attitude change angle in at least one direction, an attitude change frequency in at least one direction of the gimbal may be obtained. In response to the attitude change frequency in one of the at least one direction being a preset frequency and the attitude change angle in the one of the at least one direction being smaller than a first preset angle, the walk operation mode may be activated.

The preset frequency may be equal to approximately 1 Hz or approximately 2 Hz.

In some embodiments, an attitude change angle of the gimbal may be relatively large. For example, at least one attitude change angle may be larger than or equal to the second preset angle. That is, an attitude change angle in at least one direction may be larger than or equal to the second preset angle. Correspondingly, to ensure the following performance of the gimbal, the sensitive operation mode can be activated.

In the gimbal control method of the present disclosure, in response to the selected operation mode being the automatic matching mode, the attitude change angle in at least one direction of the gimbal may be obtained; and according to a current attitude change parameter of the gimbal, a suitable operation mode may be matched, e.g., selected for matching, such that an optimized gimbal control may be achieved without a need of the user to adjust excessive parameters, and a stability and a following performance of the gimbal may be ensured.

In addition to the above-described examples, since an operation status of the user may change from time to time, a current status of the user may be determined according to the attitude change angle of the gimbal to switch the operation mode.

If the selected corresponding operation mode is the walk operation mode, in response to an attitude change angle in at least one direction being larger than a second preset angle, the operation mode may be switched to a sensitive operation mode.

Various implementation approaches may be used to switch the operation mode to the sensitive operation mode, such as two implementation approaches described below.

In one implementation approach, the operation mode may be switched according to a control instruction sent by a user.

For example, if the selected corresponding operation mode is the walk operation mode, in response to the attitude change angle in at least one direction being larger than a second preset angle, prompt information may be sent, and the prompt information may include a recommended operation mode, such that the user may select the recommended operation mode. In response to an attitude change angle in at least one direction being larger than a second preset angle, the recommended operation mode may include a sensitive operation mode. Correspondingly, the operation mode may be switched to the sensitive operation mode through a control instruction inputted by the user.

In another implementation approach, the processor may automatically switch modes.

For example, if the selected corresponding operation mode is the walk operation mode, in response to an attitude change angle in at least one direction being larger than a second preset angle, the operation mode may be automatically switched to the sensitive operation mode.

In some embodiments, if the selected corresponding operation mode is the sensitive operation mode, in response to at least one attitude change angle being smaller than or equal to a first preset angle, the operation mode may be switched to the walk operation mode.

Various implementation approaches may be used to switch the operation mode from the sensitive operation mode to the walk operation mode, such as two implementation approaches described below.

In one implementation approach, the operation mode may be switched according to a control instruction sent by a user.

For example, if the selected corresponding operation mode is the sensitive operation mode, in response to an attitude change angle in at least one direction being smaller than or equal to a first preset angle, prompt information may be sent, and the prompt information may include a recommended operation mode, such that the user may select the recommended operation mode. In response to an attitude change angle in at least one direction being smaller than or equal to a first preset angle, the recommended operation mode may include the walk operation mode. Correspondingly, the operation mode may be switched to the walk operation mode through a control instruction inputted by the user.

In another implementation approach, the processor may automatically switch modes.

For example, if the selected corresponding operation mode includes the sensitive operation mode, in response to an attitude change angle in at least one direction being smaller than or equal to a first preset angle, the operation mode may be automatically switched to the walk operation mode.

In some embodiments, if the selected corresponding operation mode is the sensitive operation mode, in addition to obtaining an attitude change angle in at least one direction, an attitude change frequency in at least one direction of the gimbal may be obtained. In response to an attitude change frequency in one of the at least one direction being a preset frequency and the attitude change angle in the one of the at least one direction being smaller than a first preset angle, the operation mode may be switched to the walk operation mode. The preset frequency may be equal to approximately 1 Hz or approximately 2 Hz.

In the gimbal control method of the present disclosure, a user may select a corresponding operation mode according to various application scenarios. Further, the processor may automatically switch the operation mode in response to a change in the attitude change angle of the gimbal. Since the processor may switched among different operation modes, the stability of the gimbal may be ensured without the need for the use to adjust a plurality of parameters.

In addition to the above-described examples, how the processor receives the control instruction is further described below in detail.

In some embodiments, the control instruction may be sent through an operation instrument and further received by the processor. The operation instrument may include, for example, at least one of a gear switch, a knob switch, a potentiometer, a linear switch, or a touch screen.

In some embodiments, a plurality of operation modes may exist. The control instruction(s) may be sent through one operation instrument, or a plurality of operation instruments.

In response to the control instruction being sent through one operation instrument, the processor can identify different operating modes by detecting an activation time duration, in which the operation instrument is activated. In response to the processor detecting that the activation time duration of the operation instrument is approximately 2 seconds, the processor may select the walk operation mode. In response to the processor detecting that the activation time duration of the operation instrument is approximately 4 seconds, the processor may select the sensitive operation mode. Above-described 2 seconds and 4 seconds are merely for illustrative purposes and are not intended to limit the scope of the present disclosure. The value of the activation time duration can be selected according to various application scenarios.

In some embodiments, the processor may identify different operation modes by detecting the number of times for which the operation instrument is activated within a preset time interval. For example, in response to the processor detecting that the operation instrument is activated once within 0.5 seconds, the processor may select the walk operation mode. In response to the processor detecting that the operation instrument is activated twice within 0.5 second, the processor may select the sensitive operation mode. The above-described number of times for which the operation instrument is activated and 0.5 seconds are merely for illustrative purposes, and are not intended to limit the scope of the present disclosure. Various values may be selected according to application scenarios.

When the control instruction(s) are sent through a plurality of operation instruments, each operation mode may, for example, correspond to one operation instrument, and similarly, each operation instrument may, for example, correspond to one operation mode.

The operation instrument may be arranged at, for example, a gimbal or a remote controller of the gimbal.

The present disclosure provides a gimbal control apparatus, configured to perform a gimbal control method consistent with the disclosure, such as one of the above-described gimbal control methods.

Figure 6:
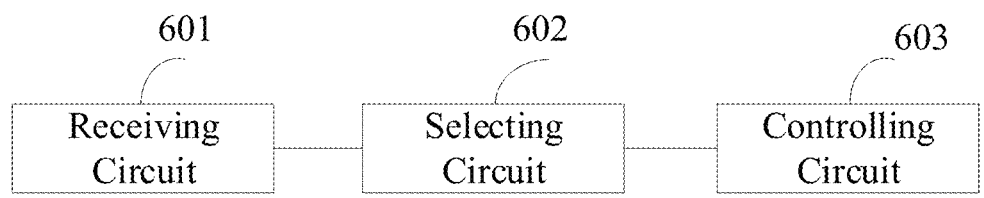
FIG. 6 is a block diagram of an exemplary gimbal control apparatus consistent with various disclosed embodiments of the present disclosure.

FIG. 6 is a block diagram of an exemplary gimbal control apparatus according to various disclosed embodiments of the present disclosure. As shown in FIG. 6, the gimbal control apparatus includes a receiving circuit 601, a selecting circuit 602, and a controlling circuit 603.

In some embodiments, the receiving circuit 601 may be configured to receive a mode selection activation condition.

The selecting circuit 602 is connected to the receiving circuit 601. The selecting circuit 602 may select a corresponding operation mode according to the mode selection activation condition. The mode selection activation condition may include at least one of a control instruction or a detected attitude change parameter of the gimbal.

The controlling circuit 603 may be connected to the selecting circuit 602, and may be configured to control, in response to the selected corresponding operation mode being the walk operation mode, a following angular velocity of the gimbal according to an attitude change parameter of the gimbal, to respond to the attitude change of the gimbal at a relatively low speed, such that the shaking of the photographing assembly may be suppressed when the user walks or runs.

In some embodiments, the receiving circuit 601 may receive a control instruction, and the selecting circuit 602 may select a corresponding operation mode among one or more operation modes.

In some embodiments, the receiving circuit 601 may receive the detected attitude change parameter of the gimbal, and the selecting circuit 602 may select a corresponding operation mode according to the detected attitude change parameter of the gimbal. That is, the selection circuit 602 can automatically select a corresponding operation mode according to an attitude change parameter of the gimbal.

In some embodiments, in response to the receiving circuit 601 detecting that an attitude change angle of the gimbal in at least one direction is smaller than a first preset angle, the selecting circuit 602 may select the walk operation mode. Further, in response to the receiving circuit 601 detecting that an attitude change frequency in at least one direction of the gimbal is a preset frequency and an attitude change angle in the at least one direction is smaller than a first preset angle, the selecting circuit 602 may select the walk operation mode.

In some embodiments, in response to the receiving circuit detecting that an attitude change angle in at least one direction is larger than or equal to a second preset angle, the selecting circuit 602 may select the sensitive operation mode. For application scenarios of the walk operation mode and the sensitive operation mode, reference can be made to the above-described examples, descriptions of which are omitted here.

In some embodiments, the selecting circuit 602 may select a walk operation mode, and the control module 603 may be configured to control a following angular velocity of the gimbal according to an attitude change parameter of the gimbal and respond to the attitude change of the gimbal at a relatively low speed. Thus, the shaking of the photographing assembly may be reduced when the user walks or runs.

In some embodiments, the selecting circuit 602 may select a sensitive operation mode, and the controlling circuit 603 may be configured to control a following angular velocity of the gimbal according to an attitude change parameter of the gimbal to quickly adjust the attitude change of the gimbal.

In some embodiments, in addition to the above-described walk operation mode and sensitive operation mode, the selecting circuit 602 may select an automatic matching mode, and the control circuit 603 may be configured to automatically match an operation mode according to an attitude change parameter of the gimbal. That is, the automatic matching mode may determine which operation mode is suitable for the gimbal currently according to the attitude change parameter of the gimbal, such as an attitude change angle and/or an attitude change frequency of the gimbal. That is, the automatic matching circuit 603 may match a corresponding operation mode according to the attitude change parameter of the gimbal.

In the gimbal control apparatus of the present disclosure, the receiving circuit 601 may receive a control instruction, and the selecting circuit 602 may select a corresponding operation mode. If the selected operation mode is the walk operation mode, the controlling circuit 603 may control a following angular velocity of the gimbal according to an attitude change parameter of the gimbal, to respond to an attitude change of the gimbal at a relatively low speed, and to reduce the shaking the photographing assembly when the user walks or runs. The user can select a corresponding mode according to a scenario that the user is in. The stability of the photographing assembly may be ensured without a need of the user to adjust excessive control parameters.

In addition to the above-described examples, as shown in FIG. 6, how the controlling module 603 controls a following angular velocity of the gimbal according to an attitude change parameter of the gimbal is further described below.

In some embodiments, the controlling circuit 603 may be configured to obtain, in response to a selected corresponding operation mode being the walk operation mode, an attitude change angle in at least one direction of the gimbal; and, in response to an attitude change angle in one of the at least one direction being smaller than a first preset angle, adjust a following angular velocity of the gimbal in the one of the at least one direction according to a preset first association relation.

In some embodiments, the attitude change angle in at least one direction obtained by the controlling circuit 603 may include an attitude change angle of at least one of a yaw direction, a pitch direction, or a roll direction.

In some embodiments, the first preset angle may be, for example, approximately 10 degrees. In some embodiments, when the user runs or walks, attitude change angles between approximately 6 degrees and approximately 8 degrees may be generated in both the pitch direction and the yaw direction. Thus, if the selecting circuit 602 selects a walk operation mode as a corresponding operation mode, in some embodiments, the controlling circuit 603 may obtain attitude change angles of only the pitch direction and the yaw direction.

For example, if the control circuit 603 obtains attitude change angles of the gimbal in the three directions of yaw, pitch and roll, and attitude change angles in the pitch and yaw directions both are smaller than the first preset angle, the controlling circuit 603 may adjust following angular velocities of the gimbal in the pitch direction and the yaw direction according to the preset first association relation. Adjusting the following angular velocities in the pitch direction and the yaw direction may be performed at a same time or one after another, which is not restricted in the present disclosure.

In some embodiments, the attitude change angle of the gimbal may be small. That is, the attitude change angle in at least one direction of the gimbal may be smaller than the first preset angle. Correspondingly, to ensure that the gimbal responds to the attitude change of the gimbal at a relatively low speed, the first association relation may include an association relation indicating that the following angular velocity is a high order concave function of the attitude change angle.

For the first association relation, reference can be made to above descriptions, descriptions of which are omitted here.

In some embodiments, the controlling circuit 603 may control a following angular velocity of the gimbal according to an attitude change angle of the gimbal using other association relation(s), as long as it is ensured that the gimbal may respond to the attitude change of the gimbal at a relatively low speed, in response to the attitude change angle being smaller than the first preset angle.

In addition, in the walk operation mode, in response to a large attitude change angle existing in at least one direction, freedom of an attitude change in the at least one direction may be reduced. For example, in response to an attitude change angle in at least one direction being larger than or equal to a second preset angle, the controlling circuit 603 may control a following angular velocity in the at least one direction of the gimbal to be equal to a preset maximum following angular velocity, where the second preset angle may be larger than or equal to the first preset angle.

In the gimbal control apparatus consistent with the preset disclosure, in response to the operation mode selected by the selecting circuit 602 being the walk operation mode, the controlling circuit 603 may obtain an attitude change angle in at least one direction of the gimbal. In response to an attitude change angle in one of the at least one direction being smaller than a first preset angle, the gimbal may be controlled to respond to the attitude change angle of the gimbal a form of high order concave function, thereby reducing shaking of the photographing assembly when the user walks or runs.

In addition to the above-described examples, the gimbal control apparatus is further described below.

As shown in FIG. 6, in response to the corresponding operation mode selected by the selecting circuit 602 being the walk operation mode, the control circuit 603 is further configured to obtain an attitude change frequency in at least one direction of the gimbal. In response to an attitude change frequency in one of the at least one direction being a preset frequency and the attitude change angle in the one of the at least one direction being smaller than a first preset angle, a following angular velocity of the gimbal in the at least one direction may be adjusted according to a preset first association relation.

The controlling circuit 603 may obtain the attitude change angle and the attitude change frequency through an inertial measurement unit (IMU). The IMU is similar to or same as the IMU described in the above examples, descriptions of which are omitted here.

In addition, in response to the attitude change frequency in one of the at least one direction being equal to the preset frequency and the attitude change angle in the one of the at least one direction being larger than or equal to a second preset angle, the controlling circuit 603 may control a following angular velocity of the gimbal in the at least one direction to be equal to a preset maximum following angular velocity.

In the gimbal control apparatus of the present disclosure, if the operation mode selected by the selecting circuit 602 is a walk operation mode, the controlling circuit 603 may obtain an attitude change angle and an attitude change frequency in at least one direction of the gimbal. In response to an attitude change frequency in one of the at least one direction being equal to a preset frequency and an attitude change angle in the one of the at least one direction being smaller than a first preset angle, a following angular velocity of the gimbal in the at least one direction may be adjusted according to the preset first association relation. That is, the following angular velocity of the gimbal may be controlled to respond to the attitude change angle of the gimbal in a form of high order concave function, thereby reducing shaking of the photographing assembly when the user walks or runs.

In addition to the above-described examples, as shown in FIG. 6, the operation mode that can be performed by the controlling circuit 603 can further include a sensitive operation mode. How the controlling circuit 603 performs the sensitive operation mode is described in detail below.

In some embodiments, the controlling circuit 603 may be further configured to control, in response to an attitude change angle in at least one direction being larger than or equal to the second preset angle, a following angular velocity in the at least one direction of the gimbal to be equal to a preset maximum following angular velocity, where the second preset angle may be larger than or equal to the first preset angle.

In response to the selecting circuit 602 selecting the sensitive operation mode, an attitude change angle in at least one direction of the gimbal may be obtained. A following angular velocity of the gimbal in the at least one direction may be adjusted according to a preset second association relation, where the second association relation may differ from the first association relation.

Under the sensitive operation mode, the controlling circuit 603 may control the following angular velocity in the at least one direction of the gimbal may be adjusted according to the preset second association relation, where the second association relation may differ from the first association relation.

In some embodiments, the second association relation may include a quadratic curve relation between the attitude change angle and the following angular velocity. Further, the following angular velocity may be increased in response to an increase of the attitude change angle. In some other embodiments, a cubic curve relation may exist between the attitude change angle and the following angular velocity, and the following angular velocity may be increased in response to an increase of the attitude change angle, to ensure that the gimbal can promptly and quickly follow the attitude change of the gimbal.

In order to promptly and quickly follow the attitude change of the gimbal during the gimbal changing the attitude, in some embodiments, the controlling circuit 603 may control the attitude change angle to be in direct proportion linear relation with the following angular velocity.

The second association relation is same as or similar to the second association relation described in the above examples. Thus, for how the controlling circuit 603 performs the process, reference can be made to the above examples associated with the second association relation, descriptions of which are omitted here.

In the gimbal control apparatus of the present disclosure, if the operation mode selected by the selecting circuit 602 is a sensitive operation mode, the controlling circuit 603 may obtain an attitude change angle in at least one direction of the gimbal, and adjust a following angular velocity of the gimbal according to the attitude change angle and a preset direct proportion linear association relation, thereby ensuring the following performance of the gimbal.

In addition to the above-described examples, as shown in FIG. 6, the controlling circuit 603 can further perform an automatic matching mode. How the controlling circuit 603 performs an automatic matching mode is described in detail below.

As the user runs or walks, the gimbal may be caused to generate an attitude change angle from approximately 6 degrees to approximately 8 degrees. Thus, if the selecting circuit 602 selects the automatic matching mode, the controlling circuit 603 may determine which operation mode is suitable for a current following angular velocity of the gimbal, and match a corresponding operation mode according to the attitude change parameter of the gimble.

For example, the controlling circuit 603 may detect that an attitude change angle in at least one direction is relatively small. That is, an attitude change angle in at least one direction may be smaller than the first preset angle. Correspondingly, the walk operation mode may be activated in order to suppress the shaking of the photographing assembly when the user walks or runs.

In some embodiments, in addition to obtaining an attitude change angle in at least one direction, the controlling circuit 603 may obtain an attitude change frequency in at least one direction of the gimbal. In response to an attitude change frequency in one of the at least one direction being equal to a preset frequency and an attitude change angle in the one of the at least one direction being smaller than a preset angle, the controlling circuit 603 may perform the walk operation mode.

In some embodiments, the controlling circuit 603 may detect that the attitude change angle of the gimbal is relatively large. That is, at least one attitude change angle may be larger than or equal to a second preset angle. Correspondingly, to ensure the following performance of the gimbal, the controlling circuit 603 may activate the sensitive operation mode.

In the gimbal control apparatus of the present disclosure, in response to the operation mode selected by the selecting circuit 602 being the automatic matching mode, the controlling circuit 603 may obtain an attitude change angle in at least one direction of the gimbal; and according to a current attitude change parameter of the gimbal, the controlling circuit 603 may automatically match a suitable operation mode, such that an optimized gimbal control may be achieved without a need of the user to adjust excessive parameters, and a stability and a following performance of the gimbal may be ensured.

In addition to the above-described examples, since the operation status of the user may change from time to time, as shown in FIG. 6, the selecting circuit 602 may determine a current status of the user according to the attitude change angle of the gimbal and further perform a switch of the operation mode.

If the corresponding operation mode selected by the selecting circuit 602 is the walk operation mode, in response to an attitude change angle in at least one direction being larger than a second preset angle, the selecting circuit 602 may switch the operation mode to the sensitive operation mode.

Various implementation approaches may be used to switch the operation mode to the sensitive operation mode, such as two implementation approaches described below.

In one implementation approach, the operation mode may be switched according to a control instruction sent by the user.

For example, if the corresponding operation mode selected by the selecting circuit 602 is the walk operation mode, the controlling circuit 603 may send, in response to obtaining an attitude change angle in at least one direction being larger than a second preset angle, prompt information, and the prompt information may include a recommended operation mode, such that the user may select the recommended operation mode. In response to the attitude change angle in the at least one direction being larger than the second preset angle, the recommended operation mode may include a sensitive operation mode. Correspondingly, the selecting circuit 602 may switch the operation mode to the sensitive operation mode through a control instruction inputted by the user.

In another implementation approach, modes may be automatically switched.

For example, if the corresponding operation mode selected by the selecting circuit 602 is the walk operation mode, in response to the controlling circuit 603 obtain an attitude change angle in at least one direction being larger than a second preset angle, the controlling circuit 603 may control the selecting circuit 602 to switch the operation mode to the sensitive operation mode.

In addition, if the corresponding operation mode selected by the selecting circuit 602 is the sensitive operation mode, in response to the controlling circuit 603 obtaining at least one attitude change angle being smaller than or equal to a first preset angle, the controlling circuit 603 may control the selecting circuit 602 to switch the operation mode to the walk operation mode.

Various implementation approaches may be used to switch the operation mode from the sensitive operation mode to the walk operation mode, such as two implementation approaches described below.

In one implementation approach, the operation mode may be switched according to a control instruction sent by the user.

For example, if the corresponding operation mode selected by the selecting circuit 602 is the sensitive operation mode, in response to an attitude change angle in at least one direction being smaller than or equal to a first preset angle, prompt information may be sent, and the prompt information may include a recommended operation mode, such that the user may select the recommended operation mode. In response to an attitude change angle in at least one direction being smaller than or equal to the first preset angle, the recommended operation mode may include the walk operation mode. Correspondingly, the operation mode may be switched to the walk operation mode through a control instruction inputted by the user.

In another implementation approach, the processor may automatically switch modes.

For example, if the corresponding operation mode selected by the selecting circuit 602 is the sensitive operation mode, in response to the controlling circuit 603 obtaining an attitude change angle in at least one direction being smaller than or equal to a first preset angle, the controlling circuit 603 may control the selecting circuit 602 to switch the operation mode to the walk operation mode.

In some embodiments, if the corresponding operation mode selected by the selecting circuit 602 is the sensitive operation mode, the controlling circuit 603 may obtain, in addition to obtaining an attitude change angle in at least one direction, an attitude change frequency in at least one direction of the gimbal. In response to an attitude change frequency in one of the at least one direction being a preset frequency and an attitude change angle in the one of the at least one direction being smaller than a first preset angle, the controlling circuit 603 may control the selecting circuit 602 to switch the operation mode to the walk operation mode.

In the gimbal control apparatus of the present disclosure, a user may activate the selecting circuit 602 to select a corresponding operation mode according to various application scenarios. Further, the controlling circuit 603 may automatically control the selecting circuit 602 to switch the operation mode in response to obtaining a change in the attitude change angle of the gimbal. Since the processor may switch among different operation modes, the stability of the gimbal may be ensured without the need for the use to adjust a plurality of parameters.

In addition to the above-described examples, as shown in FIG. 6, how the receiving circuit receives a control instruction is further described below.

In some embodiments, the control instruction received by the receiving circuit 601 may be sent by the operation instrument and received by the receiving circuit 601. The operation instrument may include, for example, at least one of a gear switch, a knob switch, a potentiometer, a linear switch, or a touch screen.

In some embodiments, a plurality of operation modes may exist. The control instruction(s) may be sent through one operation instrument or a plurality of operation instruments.

When the control instruction is sent through one operation instrument, the selecting circuit 602 can identify different operating modes by detecting activation time duration in which the operation instrument is activated. For example, in response to the selecting circuit 602 detecting that the activation time duration of the operation instrument is approximately 2 seconds, the selecting circuit 602 may select the walk operation mode. In response to the selecting circuit 602 detecting that the activation time duration of the operation instrument is approximately 4 seconds, the selecting circuit 602 may select the sensitive operation mode. The above-described 2 seconds and 4 seconds are merely for illustrative purposes and are not intended to limit the scope of the present disclosure. The value of the activation time duration can be selected according to various application scenarios.

In some embodiments, the selecting circuit 602 may identify different operation modes by detecting the number of times for which the operation instrument is activated within a preset time interval. For example, in response to the selecting circuit 602 detecting that the operation instrument is activated once within 0.5 seconds, the selecting circuit 602 may select the walk operation mode. In response to the selecting circuit 602 detecting that the operation instrument is activated twice within 0.5 seconds, the selecting circuit 602 may select the sensitive operation mode. The above-described number of times for which the operation instrument is activated and 0.5 seconds are merely for illustrative purposes, and are not intended to limit the scope of the present disclosure. Various values may be selected according to application scenarios.

When the control instruction(s) are sent through a plurality of operation instruments, for example, each operation mode may correspond to one operation instrument, and similarly, each operation instrument may correspond to one operation mode.

The operation instrument may be arranged at, for example, a gimbal or a remote controller of the gimbal.

Figure 7:
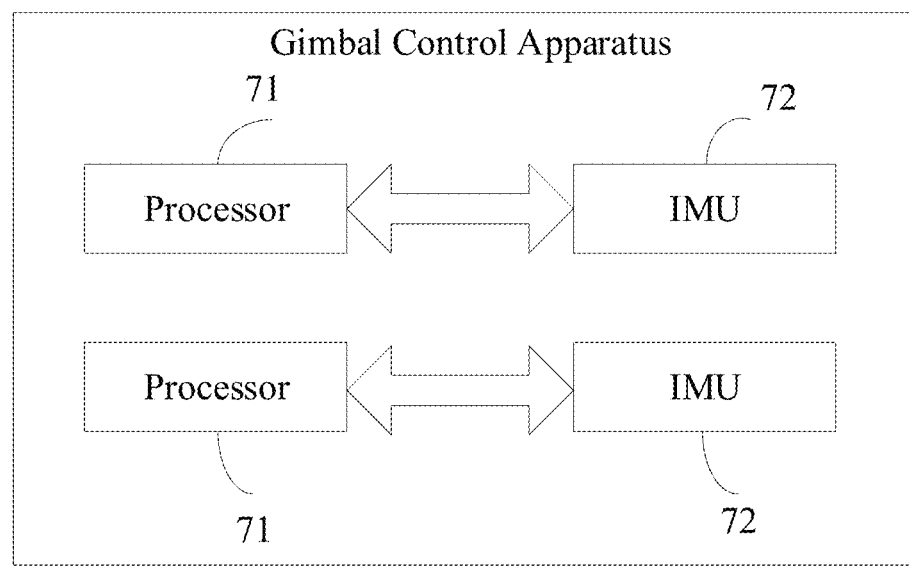
FIG. 7 is a block diagram of another exemplary control apparatus consistent with various disclosed embodiments of the present disclosure.

The present disclosure provides a gimbal control apparatus, configured to perform a gimbal control method consistent with the disclosure, such as one of the above-described gimbal control methods. FIG. 7 is a block diagram of another exemplary control apparatus consistent with various disclosed embodiments of the present disclosure. As shown in FIG. 7, the gimbal control apparatus includes one or more processors 71.

The one or more processors 71 are configured to, individually or in conjunction with each other, obtain a mode selection activation condition, and select a corresponding operation mode according to the mode selection activation condition. The mode selection activation condition may include at least one of a control instruction or a detected attitude change parameter of the gimbal. If the selected corresponding operation mode is the walk operation mode, a following angular velocity of the gimbal may be controlled according to the attitude change parameter of the gimbal, and the attitude change of the gimbal may be responded to at a relatively low speed to reduce shaking of the photographing assembly when the user walks or runs.

The operation modes may include a plurality of operation modes, which can include, but are not limited to, at least one of a walk operation mode, a sensitive operation mode, or an automatic matching mode. For the walk operation mode, the sensitive operation mode, and the automatic matching mode, reference can be made to the above-described examples, descriptions of which are omitted here.

In the gimbal control apparatus consistent with the present disclosure, the processor can select a corresponding operation mode by receiving a control instruction, and, in response to the selected operation mode being a walk operation mode, control a following angular velocity of the gimbal according to an attitude change parameter of the gimbal, to respond to an attitude change of the gimbal at a relatively low speed, and to reduce the shaking of the photographing assembly when the user walks or runs. The user can select a corresponding mode according to a scenario which the user is in, and the stability of the photographing assembly may be ensured without a need of the user to adjust excessive control parameters.

In addition to the above-described examples, as shown in FIG. 7, how the processor 71 controls a following angular velocity of the gimbal according to an attitude change parameter of the gimbal is further described below.

In some embodiments, the processor 71 may be configured to obtain, in response to the selected corresponding operation mode being the walk operation mode, an attitude change angle in at least one direction of the gimbal; and in response to an attitude change angle in at least one direction being smaller than a first preset angle, adjust a following angular velocity in the at least one direction according to a preset first association relation. The first association relation may include an association relation indicating that the following angular velocity is a high order concave function of the attitude change angle.

In some embodiments, the attitude change angle in the at least one direction obtained by the processor 71 may include an attitude change angle in at least one of a yaw direction, a pitch direction, or a roll direction.

For example, if attitude change angles in three directions, i.e., a yaw direction, a pitch direction, and a roll direction, are obtained by the processor 71, and attitude change angles in the pitch direction and the yaw direction both are smaller than the first preset angle, the processor 71 may adjust following angular velocities of the gimbal in the pitch direction and the yaw direction according to the preset first association relation. Adjusting the following angular velocities in the pitch direction and the yaw direction may be performed by the processor 71 at a same time or one after another, which is not restricted in the present disclosure.

In some embodiments, the first association relation may include an association relation indicating that the following angular velocity is a high order concave function of the attitude change angle.

For the first association relation, reference can be made to above descriptions, descriptions of which are omitted here.

In some embodiments, in response to the attitude change angle in at least one direction being larger than or equal to a second preset angle, the processor 71 may control a following angular velocity in the at least one direction of the gimbal to be equal to a preset maximum following angular velocity, where the second preset angle may be larger than or equal to the first preset angle.

In the gimbal control apparatus of the disclosure, if the operation mode selected by the processor 71 is a walk operation mode, the processor 71 may obtain an attitude change angle in at least one direction of the gimbal. If an attitude change angle in one of the at least one direction is smaller than the first preset angle, the processor 71 may control a following angular velocity of the gimbal to respond to the attitude change angle of the gimbal in a form of high order concave function, thereby reducing shaking of the photographing assembly when the user walks or runs.

In addition to the above-described examples, the gimbal control apparatus is further described below.

As shown in FIG. 7, the processor 71 is further configured to obtain, in response to the corresponding operation mode selected by the processor 71 being the walk operation mode, an attitude change frequency in at least one direction of the gimbal. In response to an attitude change frequency in at least one direction being a preset frequency and an attitude change angle being smaller than a preset angle in at least one direction, the processor 71 may adjust a following angular velocity of the gimbal in the at least one direction according to a preset first association relation.

The gimbal control apparatus may further include inertial measurement units (IMUs) 72 that communicates with the processors 71. The attitude change angle obtained by the processor 71 in at least one direction may be obtained by the inertial measurement unit (IMU) 72. The IMU is same as or similar to the IMU described in the above examples, descriptions of which are omitted here.

In addition, in response to an attitude change frequency in at least one direction being equal to the preset frequency and an attitude change angle in the at least one direction being larger than or equal to the second preset angle, the processor 71 may control a following angular velocity of the gimbal in the at least one direction to be equal to the preset maximum following angular velocity.

In the gimbal control apparatus of the present disclosure, if the operation mode selected by the processor is a walk operation mode, an attitude change angle and an attitude change frequency in at least one direction of the gimbal may be obtained. In response to an attitude change frequency in one of the at least one direction being equal to a preset frequency and an attitude change angle in the one of the at least one direction being smaller than a first preset angle, a following angular velocity of the gimbal in the at least one direction may be adjusted according to the preset first association relation. That is, the following angular velocity of the gimbal may be controlled to respond to the attitude change angle of the gimbal in a form of high order concave function, thereby reducing shaking of the photographing assembly when the user walks or runs.

In addition to the above-described examples, as shown in FIG. 7, the operation mode(s) that the processor 71 can perform may further include a sensitive operation mode. The sensitive operation mode included in the operation mode is described in detail below.

In some embodiments, the processor 71 may be further configured to control, in response to an attitude change angle in at least one direction being larger than or equal to a second preset angle, a following angular velocity in the at least one direction of the gimbal to be equal to a preset maximum following angular velocity, where the second association relation may differ from the first association relation.

The second preset angle may be larger than or equal to the first preset angle.

When the processor performs the sensitive operation mode, in order to promptly and quickly follow the attitude change of the gimbal during the gimbal changing the attitude, in some embodiments, the processor 71 may control the attitude change angle to be in direct proportion linear relation with the following angular velocity.

The second association relation is same as or similar to the second association relation described in the above examples. Thus, for how the processor 71 performs the process, reference can be made to the above examples associated with the second association relation. Descriptions of which are omitted here.

In the gimbal control apparatus of the present disclosure, if the operation mode performed by the processor 71 is a sensitive operation mode, the processor 71 may obtain an attitude change angle in at least one direction of the gimbal, and adjust a following angular velocity of the gimbal according to the attitude change angle and a preset direct proportion linear association relation, thereby ensuring a following performance of the gimbal.

In addition to the above-described examples, as shown in FIG. 7, the processor 71 can further perform an automatic matching mode. How the processor 71 performs an automatic matching mode is described in detail below.

As the user runs or walks, the gimbal may be caused to generate an attitude change angle from approximately 6 degrees to approximately 8 degrees. Thus, if the processor 71 selects the automatic matching mode, the processor 71 may determine which operation mode is suitable for a current following angular velocity of the gimbal according to the attitude change parameter of the gimbal, and match the corresponding operation mode.

For example, the processor 71 may detect that an attitude change angle in at least one direction is relatively small. That is, an attitude change angle in at least one direction may be smaller than a first preset angle. Correspondingly, the processor 71 may perform the walk operation mode in order to suppress the shaking of the photographing assembly when the user walks or runs.

In some embodiments, in addition to obtaining an attitude change angle in at least one direction, the processor 71 may obtain an attitude change frequency in at least one direction of the gimbal. In response to an attitude change frequency in one of the at least one direction being equal to a preset frequency and an attitude change angle in the one of the at least one direction being smaller than a first preset angle, the processor 71 may perform the walk operation mode.

In some embodiments, the processor 71 may detect that an attitude change angle of the gimbal is relatively large. That is, at least one attitude change angle may be larger than or equal to a second preset angle. Correspondingly, to ensure the following performance of the gimbal, the processor 71 may perform the sensitive operation mode.

In the gimbal control apparatus of the present disclosure, if the operation mode selected by the processor 71 is the automatic matching mode, an attitude change angle in at least one direction of the gimbal may be obtained; and according to a current attitude change angle of the gimbal, a suitable operation mode may be matched, such that an optimized gimbal control may be achieved without a need for the user to adjust excessive parameters, and a stability and a following performance of the gimbal may be ensured.

In addition to the above-described examples, since the operation status of the user may change from time to time, as shown in FIG. 7, the processor 71 may determine a current status of the user according to the attitude change angle of the gimbal to switch the operation mode.

If the corresponding operation mode selected by the processor 71 is the walk operation mode, in response to an attitude change angle in at least one direction being larger than a second preset angle, the operation mode may be switched to the sensitive operation mode.

Various implementation approaches may be used for the processor 71 to switch the operation mode to the sensitive operation mode, such as two implementation approaches described below.

In one implementation approach, the operation mode may be switched according to a control instruction sent by a user.

In another implementation approach, the processor 71 may automatically switch modes.

Various implementation approaches may be used for the processor 71 to switch the operation mode from the sensitive operation mode to the walk operation mode, such as two implementation approaches described below.

In one implementation approach, the operation mode may be switched according to a control instruction sent by a user.

In another implementation approach, the processor 71 may automatically switch modes.

For the processes of the processor 71 performing the above-described implementation approaches, reference can be made to above-described examples, descriptions of which are omitted here.

In the gimbal control apparatus of the present disclosure, the user may activate the processor to select a corresponding operation mode according to various application scenarios. Further, the processor may automatically switch the operation mode in response to obtaining a change in the attitude change angle of the gimbal. Since switching may be made among different operation modes, the stability of the gimbal may be ensured without the need for the use to adjust a plurality of parameters.

In addition to the above-described examples, as shown in FIG. 7, how the processor 71 receives a control instruction is further described below.

In some embodiments, the control instruction received by the processor 71 may be sent by the operation instrument and received by the processor 71. The operation instrument is same as or similar to the operation instrument described in the above examples, descriptions of which are omitted here.

Figure 8:
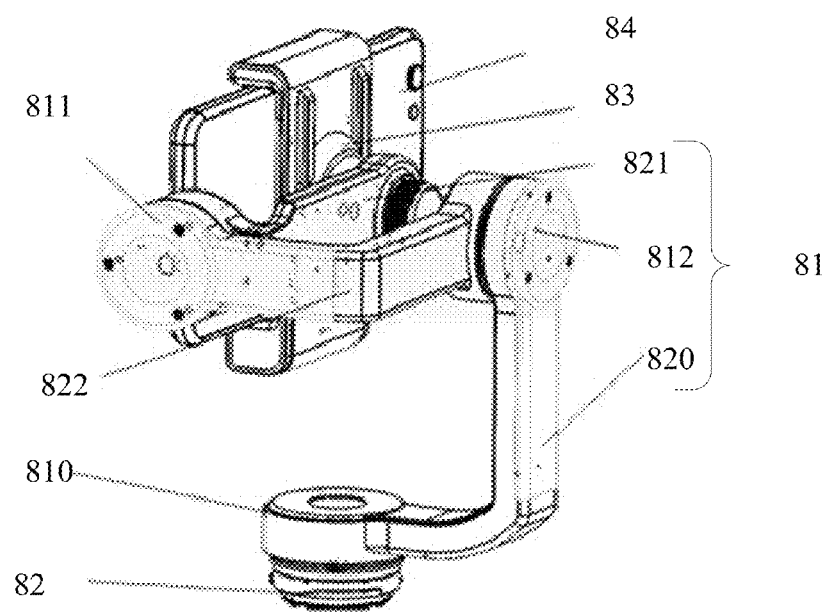
FIG. 8 is a schematic structural diagram of an exemplary gimbal consistent with various disclosed embodiments of the present disclosure.

The present disclosure provides a gimbal. FIG. 8 is a schematic structural diagram of an exemplary gimbal consistent with various disclosed embodiments of the present disclosure. As shown in FIG. 8, the gimbal includes a processor (not shown) and an adjustment mechanism 81 that communicates with the processor.

In some embodiments, as shown in FIG. 8, the gimbal further includes a base 82 connected to the adjustment mechanism 81 and the processor.

In some embodiments, as shown in FIG. 8, a bracket 83 for mounting a photographing assembly 84 is attached to the adjustment mechanism 81, and the photographing assembly 84 may be mounted to the bracket 83.

In some embodiments, the processor may be configured to obtain a mode selection activation condition and select a corresponding operation mode according to the mode selection activation condition. The mode selection activation condition may include at least one of a control instruction or a detected attitude change parameter of the gimbal. If the corresponding operation mode selected by the processor is the walk operation mode, the processor may control a following angular velocity of the adjustment mechanism 81 according to an attitude change parameter of the adjustment mechanism 81, such that the adjustment mechanism 81 may respond to the attitude change of the adjustment mechanism 81 at a relatively low speed to reduce shaking of the photographing assembly when the user walks or runs.

In the gimbal of the present disclosure, the processor may obtain a mode selection activation condition, and select a corresponding operation mode according to the mode selection activation condition. If the selected operation mode is a walk operation mode, a following angular velocity of the adjustment mechanism may be controlled according to the attitude change parameter of the adjustment mechanism, such that the adjustment mechanism may respond to the attitude change of the adjustment mechanism at a relatively low speed to reduce shaking of the photographing assembly when the user walks or runs. The user can choose a corresponding mode according to a scenario that the user stays in, and can ensure a stability of the photographing assembly with a need to adjust excessive control parameters.

In addition to the above-described examples, as shown in FIG. 8, how the processor controls a following angular velocity of the adjustment mechanism 81 according to an attitude change parameter of the adjustment mechanism 81 is further described below.

In some embodiments, the processor may be configured to obtain, in response to a selected corresponding operation mode being the walk operation mode, an attitude change angle in at least one direction of the adjustment mechanism 81; and, in response to an attitude change angle in one of the at least one direction being smaller than a first preset angle, to adjust a following angular velocity of the adjustment mechanism 81 in the at least one direction according to a preset first association relation.

In some embodiments, the first association relation may include an association relation indicating that the following angular velocity is a high order concave function of the attitude change angle.

The adjustment mechanism 81 may include a motor, an output axis connected to the motor, and a connection arm fixed to the output axis. The motor may communicate with the processor. The motor may be configured to adjust a following angle of the connection arm according to an attitude change parameter of the adjustment mechanism 81.

The number of motors may correspond to the number of output axes and the number of connection arms in a one-to-one manner. The number of motors, the number of output axes, and the number of connection arms are not restricted, and may be selected according to various application scenarios. In some embodiments, for example, the number of motors may be three, the number of corresponding output axes may be three, and the three output axes may be perpendicular to each other and may be in the yaw direction, the pitch direction, and the roll direction, respectively. As shown in FIG. 8, the adjustment mechanism 81 includes a yaw direction motor 810, a yaw direction connection arm 820, a pitch direction motor 811, a pitch direction connection arm 821, a roll direction motor 812, and a roll direction connection arm 822. The direction of each connection arm is parallel to the direction of the output axis that the connection arm is fixed to.

In some embodiments, at least one connection arm may be fixed to the photographing assembly 84.

In some embodiments, the number of motors may be, for example, two. Correspondingly, the adjustment mechanism 81 may include connection arms in any two directions selected from the directions including a yaw direction, a pitch direction, and a roll direction. In some embodiments, the number of motors may be, for example, one, and reference can be made to the above-described examples, descriptions of which are not repeated here.

In some embodiments, the first association relation may include an association relation indicating that the following angular velocity is a high order concave function of the attitude change angle.

For the first association relation, reference can be made to above descriptions, descriptions of which are omitted here.

In addition, in the walk operation mode, in response to a large attitude change angle existing in at least one direction, freedom of attitude change in the at least one direction may be reduced. For example, in response to an attitude change angle in at least one direction being larger than or equal to a second preset angle, the processor may control a following angular velocity of the adjustment mechanism 81 in the at least one direction to be equal to a preset maximum following angular velocity, where the second preset angle may be larger than or equal to the first preset angle.

In the gimbal of the disclosure, if the operation mode selected by the processor is a walk operation mode, the processor may obtain an attitude change angle in at least one direction of the adjustment mechanism 81. If the attitude change angle in one of the at least one direction is smaller than the first preset angle, the processor may control a following angular velocity of the adjustment mechanism 81 to respond to the attitude change angle of the adjustment mechanism 81 in a form of high order concave function, thereby reducing shaking of the photographing assembly when the user walks or runs.

In addition to the above-described examples, as shown in FIG. 8, the processor is further configured to obtain, in response to the corresponding operation mode selected by the processor being the walk operation mode, an attitude change frequency in at least one direction of the adjustment mechanism 81. In response to an attitude change frequency in at least one direction being a preset frequency and an attitude change angle being smaller than a preset angle in at least one direction, the processor may adjust a following angular velocity of the adjustment mechanism 81 in the at least one direction according to a preset first association relation.

The gimbal may further include an inertial measurement unit (IMU) (not shown in the figure) that communicates with the processor. The attitude change angle obtained by the processor in at least one direction may be obtained by the inertial measurement unit (IMU). The IMU is same as or similar to the IMU described in the above examples, descriptions of which are omitted here.

IMU(s) may be arranged at one or more arms, e.g., connection arms, of the adjustment mechanism 81, and the attitude change parameter(s) of the adjustment mechanism 81 may be obtained through the IMU.

In some embodiments, the output axis of the motor may be provided with an angle sensor. The angle sensor may be configured to obtain a relative angle between the adjustment mechanism 81 and the photographing assembly 84, such that the attitude change parameter of the adjustment mechanism 81 can be obtained according to the relative angle.

In addition, in response to an attitude change frequency being equal to a preset frequency and an attitude change angle being larger than or equal to a second preset angle in at least one direction, the processor may control a following angular velocity of the adjustment mechanism 81 in the at least one direction to be equal to a preset maximum following angular velocity.

In the gimbal of the present disclosure, if the operation mode selected by the processor is a walk operation mode, an attitude change angle and an attitude change frequency in at least one direction of the gimbal may be obtained. In response to an attitude change frequency in one of the at least one direction being a preset frequency and an attitude change angle in the one of the at least one direction being smaller than a first preset angle, a following angular velocity of the adjustment mechanism in the at least one direction may be adjusted according to a preset first association relation. That is, a following angular velocity of the adjustment mechanism may be controlled to respond to the attitude change angle of the adjustment mechanism in a form of high order concave function, thereby reducing shaking of the photographing assembly when the user walks or runs.

In addition to the above-described examples, as shown in FIG. 8, the operation mode that the processor can perform may further include a sensitive operation mode. The sensitive operation mode included in the operation mode is described in detail below.

In some embodiments, the processor may be further configured to control, in response to an attitude change angle in at least one direction being larger than or equal to a second preset angle, a following angular velocity in the at least one direction of the adjustment mechanism 81 may be controlled to be equal to a preset maximum following angular velocity, where the second preset angle may be larger than or equal to the first preset angle.

The processor may be further configured to obtain, in response to performing the sensitive operation mode, an attitude change angle in at least one direction of the gimbal, and adjust a following angular velocity of the gimbal in the at least one direction according to a preset second association relation, where the second association relation may differ from the first association relation.

Under the sensitive operation mode, the processor may adjust the following angular velocity of the gimbal in the at least one direction according to the preset second association relation. In some embodiments, the second association relation may include a quadratic curve relation between the attitude change angle and the following angular velocity, and the following angular velocity may be increased in response to an increase of the attitude change angle. In some other embodiments, a cubic curve relation may exist between the attitude change angle and the following angular velocity. Further, the following angular velocity may be increased in response to an increase of the attitude change angle, to ensure that the gimbal can promptly and quickly follow the attitude change of the gimbal.

In some embodiments, the processor may control the following angular velocity to be in a direct proportion linear relation with the attitude change angle.

The second association relation is same as or similar to the second association relation described in the above examples. Thus, for how the processor performs the process, reference can be made to the above examples associated with the second association relation, descriptions of which are omitted here.

In the gimbal of the present disclosure, if the operation mode performed by the processor is a sensitive operation mode, the processor may obtain an attitude change angle in at least one direction of the gimbal, and adjust a following angular velocity of the gimbal according to the attitude change angle and a preset direct proportion linear association relation, thereby ensuring a following performance of the gimbal.

In addition to the above-described examples, as shown in FIG. 8, the processor can further perform an automatic matching mode. How the processor performs an automatic matching mode is described in detail below.

If the processor selects the automatic matching mode, the processor may determine which operation mode is suitable for a current following angular velocity of the gimbal according to the attitude change parameter of the gimbal 82, and match the corresponding operation mode.

In some embodiments, in addition to obtaining an attitude change angle in at least one direction, the processor may obtain an attitude change frequency in at least one direction of the gimbal 82. In response to an attitude change frequency in one of the at least one direction being a preset frequency and an attitude change angle in the one of the at least one direction being smaller than a first preset angle, the processor may perform the walk operation mode.

The preset frequency may be equal to approximately 1 Hz or approximately 2 hertz.

In some embodiments, the processor may detect that an attitude change angle of the gimbal 82 is relatively large. That is, at least one attitude change angle may be larger than or equal to a second preset angle. Correspondingly, to ensure the following performance of the adjustment mechanism 81, the processor may perform the sensitive operation mode.

In the gimbal of the present disclosure, if the operation mode selected by the processor is the automatic matching mode, an attitude change angle in at least one direction of the gimbal 82 may be obtained; and according to a current attitude change angle of the gimbal 82, a suitable operation mode may be automatically matched, such that an optimized gimbal control may be achieved without a need of the user to adjust excessive parameters, and a stability and a following performance of the gimbal may be ensured.

In addition to the above-described examples, since the operation status of the user may change from time to time, the processor may determine a current status of the user according to an attitude change angle of the gimbal and further switch the operation mode.

If the corresponding operation mode selected by the processor is the walk operation mode, in response to an attitude change angle in at least one direction being larger than a second preset angle, the operation mode may be switched to the sensitive operation mode.

Various implementation approaches may be used for the processor to switch the operation mode to the sensitive operation mode, such as two implementation approaches described below.

In one implementation approach, the operation mode may be switched according to a control instruction sent by a user.

In another implementation approach, the processor may automatically switch modes.

Various implementation approaches may be used for the processor to switch the operation mode from the sensitive operation mode to the walk operation mode, such as two implementation approaches described below.

In one implementation approach, the operation mode may be switched according to a control instruction sent by the user.

In another implementation approach, the processor may automatically switch modes.

For the processes of the processor performing the above-described implementation approaches, reference can be made to above-described examples, descriptions of which are omitted here.

In some embodiments, the control instruction received by the processor may be sent by the operation instrument and received by the processor. The operation instrument may include, for example, at least one of a gear switch, a knob switch, a potentiometer, a linear switch, or a touch screen.

In the gimbal of the present disclosure, a user may activate the processor to select a corresponding operation mode according to various application scenarios. Further, the processor may automatically switch the operation mode in response to obtaining a change in the attitude change angle of the gimbal. Since operation mode switching may be performed among different operation modes, the stability of the gimbal may be ensured without the need for the use to adjust a plurality of parameters.

Those of ordinary skill in the art will appreciate that the exemplary elements and algorithm steps described above can be implemented in electronic hardware, or in a combination of computer software and electronic hardware. Whether these functions are implemented in hardware or software depends on the specific application and design constraints of the technical solution. One of ordinary skill in the art can use different methods to implement the described functions for different application scenarios, but such implementations should not be considered as beyond the scope of the present disclosure.

For simplification purposes, detailed descriptions of the operations of exemplary systems, devices, and units may be omitted and references can be made to the descriptions of the exemplary methods.

The disclosed systems, apparatuses, and methods may be implemented in other manners not described here. For example, the devices described above are merely illustrative. For example, the division of units may only be a logical function division, and there may be other ways of dividing the units. For example, multiple units or components may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physically unit, or two or more units may be integrated in one unit.

A method consistent with the disclosure can be implemented in the form of computer program stored in a non-transitory computer-readable storage medium, which can be sold or used as a standalone product. The computer program can include instructions that enable a computing device, such as a processor, a personal computer, a server, or a network device, to perform part or all of a method consistent with the disclosure, such as one of the exemplary methods described above. The storage medium can be any medium that can store program codes, for example, a USB disk, a mobile hard disk, a read-only memory (ROM), a random access memory (RAM), a magnetic disk, or an optical disk.

Other embodiments of the disclosure will be apparent to those skilled in the art from consideration of the specification and practice of the embodiments disclosed herein. It is intended that the specification and examples be considered as exemplary only and not to limit the scope of the disclosure, with a true scope and spirit of the invention being indicated by the following claims.

What is claimed is:

1. An apparatus for controlling a gimbal comprising:
one or more processors individually or collectively configured to:
determine an operation mode of the gimbal according to a mode selection activation condition, the operation mode including a walk operation mode or a sensitive operation mode; and
in response to determining that the operation mode is the walk operation mode, control the gimbal to adjust attitude according to a preset association relation between an attitude change angle of the gimbal and a following angular velocity of the gimbal, the preset association relation including a function, and a positive slope of the function increasing with an increase of the attitude change angle of the gimbal.

2. The apparatus according to claim 1, wherein the one or more processors are further configured to, in response to the operation mode being the walk operation mode:
obtain the attitude change angle of an adjustment mechanism of the gimbal in a direction; and
in response to the attitude change angle being smaller than a preset angle, adjust the following angular velocity of the adjustment mechanism in the direction according to the preset association relation.

3. The apparatus according to claim 2, wherein:
the preset association relation includes that the following angular velocity is a fourth order concave function of the attitude change angle; and
at least one of coefficients of the fourth order concave function is larger than zero.

4. The apparatus according to claim 2, wherein:
the preset angle is a first preset angle, and
the one or more processors are further configured to:
in response to the attitude change angle in the direction being larger than or equal to a second preset angle, control the following angular velocity of the adjusting mechanism in the direction to be equal to a preset maximum following angular velocity, the second preset angle being larger than or equal to the first preset angle.

5. The apparatus according to claim 2, wherein:
the preset angle is a first preset angle, and
the one or more processors are further configured to:
in response to the attitude change angle becoming larger than a second preset angle, switch the operation mode from the walk operation mode to the sensitive operation mode, the second preset angle being larger than or equal to the first preset angle.

6. The apparatus according to claim 2, wherein the preset angle is about 10°.

7. The apparatus according to claim 2, wherein the direction is a yaw direction, a pitch direction, or a roll direction.

8. The apparatus according to claim 2, wherein the one or more processors are further configured to obtain the attitude change angle through an inertial measurement unit communicatively coupled to the one or more processors.

9. The apparatus according to claim 1, wherein the one or more processors are further configured to, in response to the operation mode being the walk operation mode:
obtain the attitude change angle of an adjustment mechanism of the gimbal in a direction;
obtain an attitude change frequency of the adjustment mechanism in the direction; and
in response to the attitude change frequency being equal to a preset frequency and the attitude change angle being smaller than a preset angle, adjust the following angular velocity of the adjustment mechanism in the direction according to the preset association relation.

10. The apparatus of claim 9, wherein the preset frequency is about 1 Hz or about 2 Hz.

11. An apparatus for controlling a gimbal comprising:
one or more processors individually or collectively configured to:
determine an operation mode of the gimbal according to a mode selection activation condition, the operation mode including a walk operation mode or a sensitive operation mode; and
in response to determining that the operation mode is the sensitive operation mode:
obtain an attitude change parameter of the gimbal; and
adjust a following angular velocity of the gimbal according to a preset association relation between the attitude change parameter and the following angular velocity, the preset association relation including an approximately linear function.

12. The apparatus according to claim 11, wherein the attitude change parameter includes an attitude change angle of an adjustment mechanism of the gimbal in a direction.

13. The apparatus according to claim 12, wherein the one or more processors are further configured to adjust the following angular velocity in the direction according to the preset association relation.

14. The apparatus according to claim 11, wherein the function is a positive linear function.

15. The apparatus according to claim 12, wherein the one or more processors are further configured to:
in response to the attitude change angle of the adjustment mechanism in the direction being smaller than a preset angle, switch the operation mode from the sensitive operation mode to the walk operation mode.

16. An apparatus for controlling a gimbal comprising:
one or more processors individually or collectively configured to:
determine an operation mode of the gimbal according to a mode selection activation condition, the operation mode including a walk operation mode, a sensitive operation mode, or an automatic matching mode; and
in response to determining that the operation mode is the automatic matching mode:
obtain an attitude change parameter of the gimbal; and
select the walk operation mode or the sensitive operation mode according to the attitude change parameter, including:
in response to the operation mode being the sensitive operation mode, adjusting a following angular velocity of the gimbal according to a preset association relation between the attitude change parameter and the following angular velocity, the preset association relation including an approximately linear function.

17. The apparatus according to claim 16, wherein:
the attitude change parameter of the gimbal includes an attitude change angle of an adjustment mechanism of the gimbal in a direction; and
the one or more processors are further configured to, in response to the attitude change angle in the direction being smaller than a preset angle, activate the walk operation mode.

18. The apparatus according to claim 17, wherein:
the preset angle is a first preset angle; and
the one or more processors are further configured to:
in response to the attitude change angle in the direction being larger than or equal to a second preset angle, activate the sensitive operation mode.

19. The apparatus according to claim 16, wherein:
the attitude change parameter of the gimbal includes an attitude change angle of an adjustment mechanism of the gimbal in a direction and an attitude change frequency of the adjustment mechanism in the direction; and
the one or more processors are further configured to:
in response to the attitude change frequency being equal to a preset frequency and the attitude change angle being smaller than a preset angle, activate the walk operation mode.

* * * * *